United States Patent [19]

Enomoto

[11] Patent Number: 5,222,191
[45] Date of Patent: Jun. 22, 1993

[54] FUZZY HARDWARE SYSTEM
[75] Inventor: Toshio Enomoto, Tokyo, Japan
[73] Assignee: NEC Corporation, Tokyo, Japan
[21] Appl. No.: 790,256
[22] Filed: Nov. 8, 1991
[30] Foreign Application Priority Data
   Nov. 8, 1991 [JP] Japan .................... 2-303461
[51] Int. Cl.$^5$ .................... G06G 7/00; H03K 19/00
[52] U.S. Cl. ........................ 395/3; 395/900; 364/807
[58] Field of Search ............. 395/3, 61, 900; 364/807

[56]         References Cited
         U.S. PATENT DOCUMENTS

| | | | |
|---|---|---|---|
| 4,837,725 | 6/1989 | Yamakawa | 395/900 |
| 4,875,184 | 10/1989 | Yamakawa | 395/3 |
| 5,126,600 | 6/1992 | Zhang | 395/3 |
| 5,131,071 | 7/1992 | Tsutsumi et al. | 395/3 |

OTHER PUBLICATIONS

Yamakawa, "Intrinsic Fuzzy Electronic Circuits for Sixth Generation Computer," Fuzzy Computing, Gupta and Yamakawa, eds, 1988, pp. 157–171.
Isik, "Inference Hardware for Fuzzy Rule Based Systems," Fuzzy Computing, Gupta and Yamakawa, eds, 1988, pp. 185–194.
Watanabe et al, "A VLSI Fuzzy logic Controller with Reconfigurable Cascadable Architecture" IEEE Journal of Solid State Circuits, Apr. 1990.
Togai et al, "A Fuzzy Logic and a Fuzzy Inference Accelerator for Real-Time Approximate Reasoning" Proc. 17th Inter. Sym. on Multiple Valued Logic, May 1987

Primary Examiner—Allen R. MacDonald
Assistant Examiner—George Davis

[57]           ABSTRACT

A fuzzy hardware system includes a sampling circuit which carries out sampling of a first membership function in generate a fuzzy set consisting of a plurality of singletons, and an arithmetic circuit which carries out arithmetic processes in accordance with supplied signals each having either characteristic of a pulse width and a number of pulses corresponding to a size of the singletons. In the arithmetic circuit, minimum and maximum arithmetic processes are carried out by AND and OR gates. Such arithmetic processes are carried out by either process of serial, parallel and combinations of serial and parallel.

4 Claims, 13 Drawing Sheets

FIG. 5A
PRIOR ART
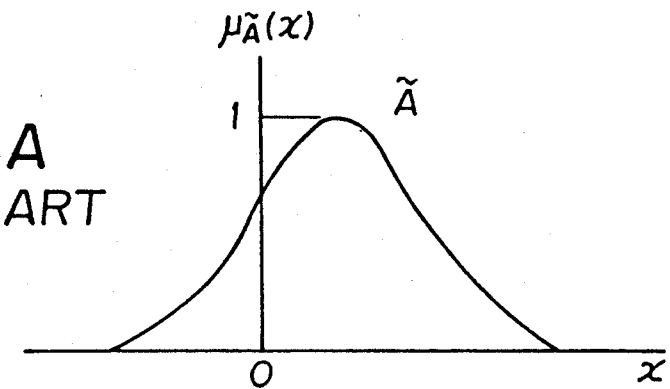
FIG. 5B
PRIOR ART
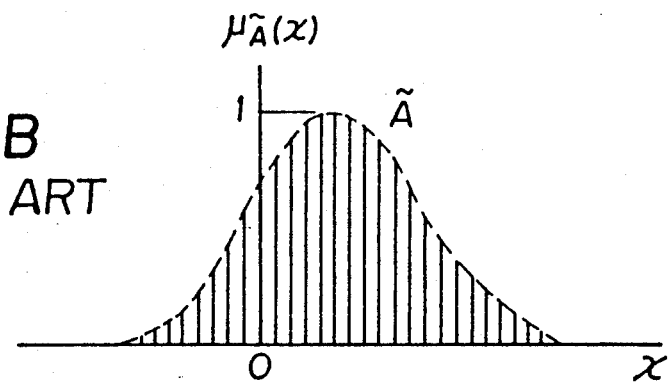
FIG. 5C
PRIOR ART
A = (0, 0, 0, ---, 0.1, 0.15, ---, 0.8, ---, 1.0, ---, 0.6, ---, 0, 0, ---, 0)

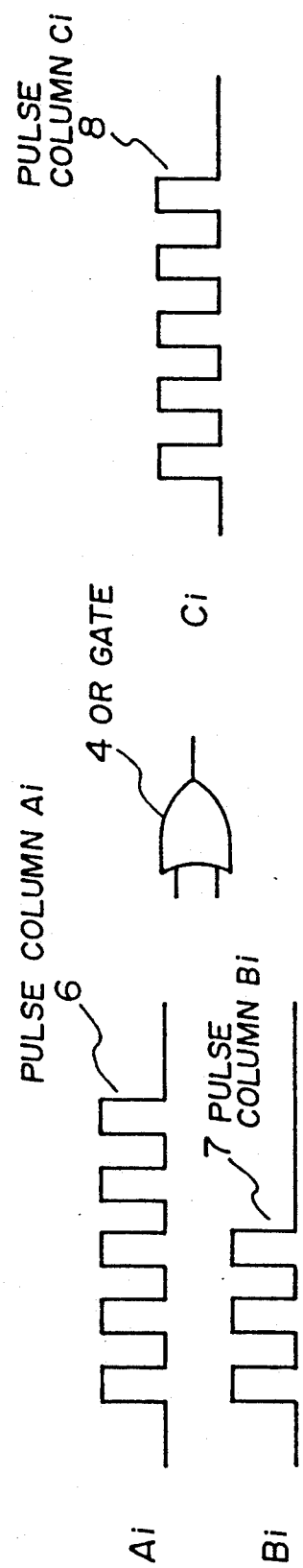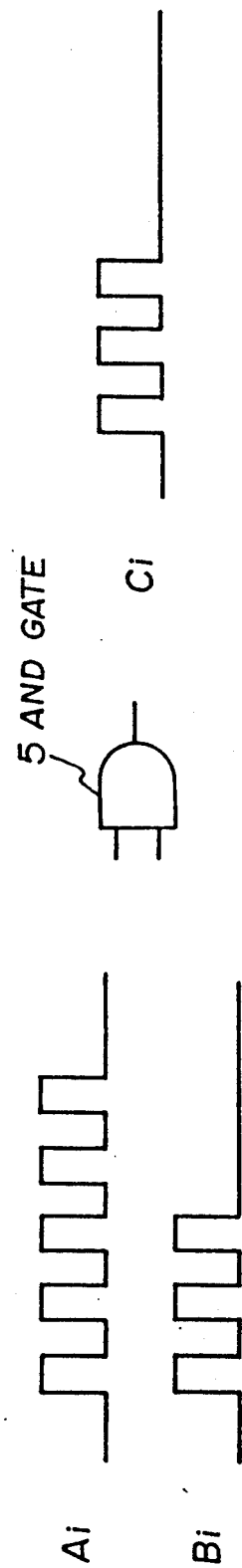

FUZZY HARDWARE SYSTEM

FIELD OF THE INVENTION

This invention relates to a fuzzy hardware system, and more particularly to, a digital fuzzy hardware system for fuzzy control.

BACKGROUND OF THE INVENTION

Fuzzy systems are used to control apparatus such as air conditioners by fuzzy control. In the fuzzy system, fuzzy deductions are carried out in which a deduction rule is defined if adequate results can be obtained by fact information having fuzzy borders. Such fuzzy systems for fuzzy control are classified to two groups, one is controlled by software and the other is controlled by hardware. The fuzzy system controlled by hardware has an advantage in that arithmetic processes are carried out in a higher speed compared with that controlled by software. The fuzzy system controlled by hardware is then classified to analog and digital types.

A conventional analog fuzzy hardware system includes a minimum arithmetic circuit (defined as a MIN arithmetic circuit hereinafter), a maximum arithmetic circuit (defined as a MAX arithmetic circuit hereinafter) and a truncation gate circuit. The MIN arithmetic circuit supplies a data signal having a minimum value selected from a plurality of input data signals. The MAX arithmetic circuit supplies a data signal having a maximum value selected therefrom. The truncation gate circuit carries out a head-cut ($\alpha$-cut) process in which a plurality of input signals are cut to have predetermined values if the input signals are over the predetermined value.

A conventional digital fuzzy hardware system includes a basic block consisting of first and second MIN arithmetic circuits each having two input terminals, a MAX circuit and a 3-bit shift register. In the digital fuzzy hardware system, a membership function is used for fuzzy process. The membership function which is a fuzzy set is sampled to provide a plurality of singletons which form a vector. Each singleton is represented by 4-bit binary word consisting of "0" or "1" to represent the grade. The data consisting of the plurality of the 4-bit binary words are processed serially, so that number of stages of the basic blocks are used. In each basic block, first and second clocks which have different phases are used.

In operation, fuzzy word Ai which is the data of the previous stage and the fuzzy word A' which represents the fact information are supplied as every 4-bit word (element) to the first MIN arithmetic circuit in which the elements of the two fuzzy words Ai and A' are compared by serial process in synchronizing with the first clock, and the smaller one is supplied to the MAX arithmetic circuit. In the MAX arithmetic circuit, the supplied element is compared with the one supplied from the 3-bit shift register, and the larger one is supplied to the 3-bit shift register. In the 3-bit register, the supplied element is shifted in turn, and then is supplied to both the MAX arithmetic circuit and the second MIN arithmetic circuit. In the second MIN arithmetic circuit, the supplied element is compared with a corresponding element of a fuzzy word Bi, and the smaller one is supplied as an output. Thus, one deduction process completes by carrying out these processes explained above for 256 clock cycles.

In this example, sixteen deduction processes are carried out simultaneously at sixteen fuzzy deduction engines corresponding to the basic block, respectively. Then, MAX arithmetic process of the results of the sixteen deductions is carried out to be integrated. The MAX arithmetic process thereof is carried out by the MAX arithmetic circuit having two input terminals, so that the results of the sixteen deductions $B_1'$, $B_2'$, $B_3'$, ... $B_{16}'$ are passed through four stages of MAX trees to obtain the integrated results of the MAX arithmetic process. Accordingly, the final deduction results B' is supplied serially from the output terminal of the MAX tree.

According to the conventional fuzzy hardware system, however, there are disadvantages as explained below. In the conventional analog fuzzy hardware system, the power consumption thereof is large, because many constant current sources are used therein. Such a large power consumption as well as heat generation in elements composing the system may become obstacles to increase of degree of integration. On the other hand, in the conventional digital fuzzy hardware system, the MIN or MAX arithmetic circuit in the basic block has only two input terminals, so that many stages of basic blocks are required. Consequently, the system scale may become large, and it is difficult to combine serial and parallel processes in response to the system scale.

SUMMARY OF THE INVENTION

Accordingly, it is an object of the invention to provide a fuzzy hardware system having both small power consumption and heat generation.

It is another object of the invention to provide a fuzzy hardware system which is able to combine serial and parallel processes.

According to a feature of the invention, a fuzzy hardware system comprises:

means for sampling a first membership function to generate a fuzzy set consisting of a plurality of singletons; and means for carrying out arithmetic process in accordance with supplied signals each having either characteristic of a pulse width and a number of pulses corresponding to a size of the singletons.

BRIEF DESCRIPTION OF THE DRAWINGS

The invention will be explained in more detail in conjunction with appended drawings wherein:

FIGS. 5A, 5B and 5C are explanatory views illustrating a membership function of a fuzzy set used in the conventional digital hardware system;

FIGS. 8A and 8B are explanatory views explaining operation of MIN and MAX arithmetic processes in case of a signal having pulses whose number corresponding to a value of data;

DESCRIPTION OF THE PREFERRED EMBODIMENTS

Before describing a fuzzy hardware system in a preferred embodiment according to the invention, the conventional fuzzy hardware system described before will be explained.

Figure 1:
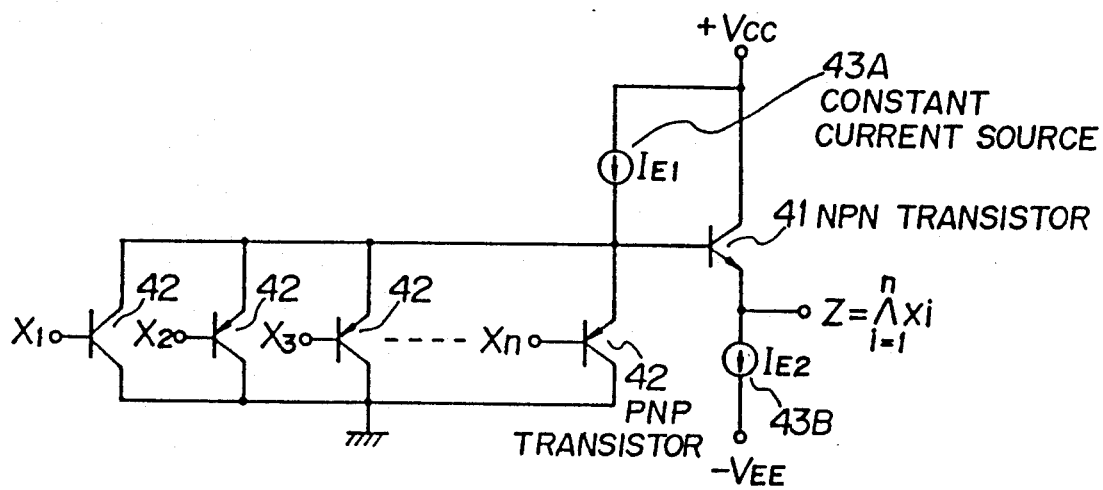
FIG. 1 is a circuitry diagram of a MIN arithmetic circuit in a conventional analog fuzzy hardware system.
Figure 2:
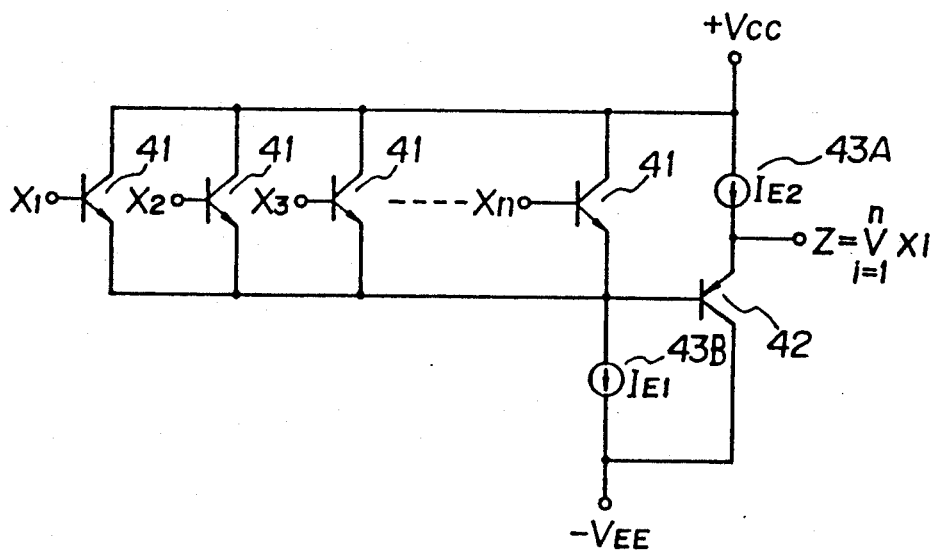
FIG. 2 is a circuitry diagram of a MAX arithmetic circuit in the conventional analog fuzzy hardware system.
Figure 3:
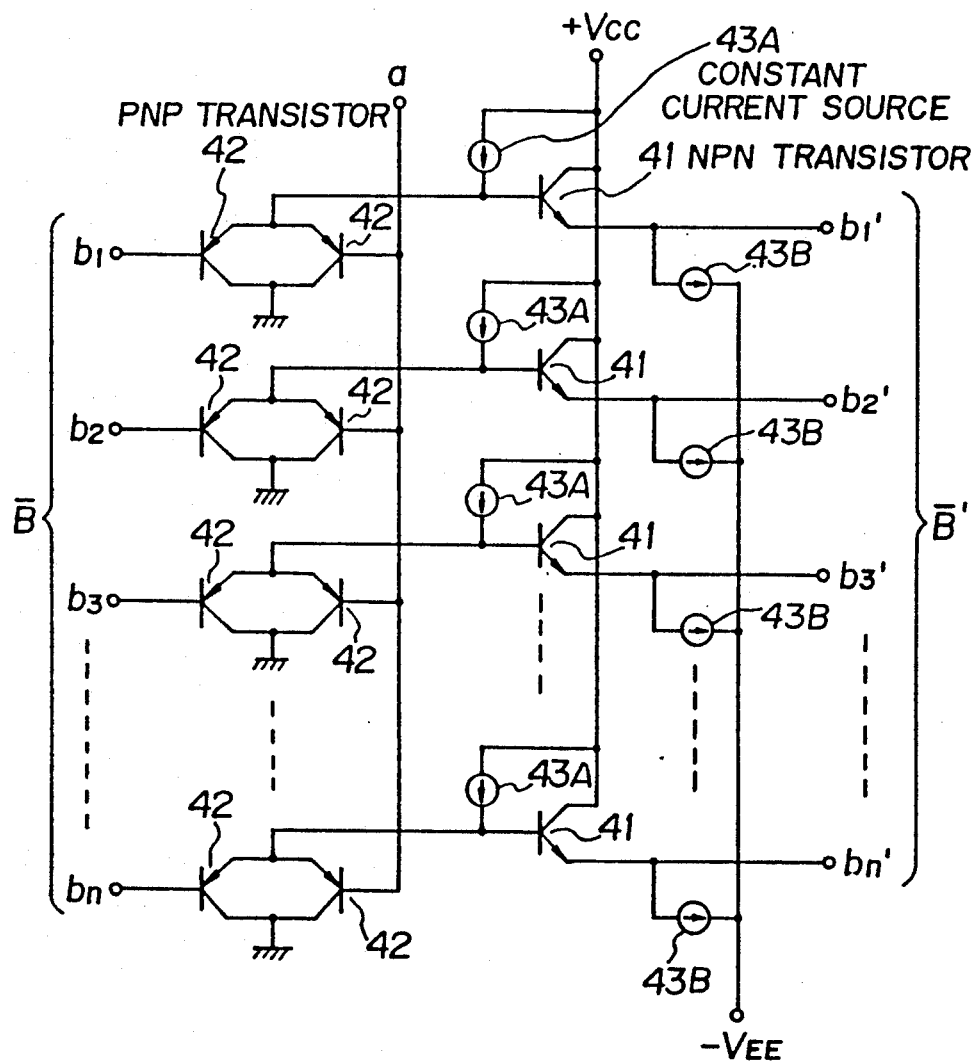
FIG. 3 is a circuitry diagram of a truncation gate circuit in the conventional analog fuzzy hardware system.

FIGS. 1 to 3 show MIN and MAX circuits and a truncation gate circuit in the conventional analog fuzzy hardware system, respectively. The MIN arithmetic circuit includes an NPN transistor 41, a plurality (n) of PNP transistors 42, and two constant current sources 43A and 43B. The NPN transistor 41 is connected at a base to emitters of the PNP transistors 42 which are connected in common, at a collector to a first power supply voltage $+V_{CC}$, and at an emitter to an output terminal Z. The PNP transistors 42 are connected at bases to inputs terminals $X_1, X_2, X_3, \ldots, X_n$, respectively, and at collectors to ground in common. The constant current sources 43A and 43B are connected between the first power supply voltage $+V_{CC}$ and the base of the NPN transistor 41, and between the output terminal Z and a second power supply voltage $-V_{EE}$, respectively.

In this MIN arithmetic circuit, the output signal $$Z\left(= \bigcap_{i=1}^{n} X_i\right)$$

is determined by a minimum value among the input signals $X_1, X_2, \ldots X_n$ applied to the bases of the transistors 42.

The MAX arithmetic circuit includes a PNP transistor 42, a plurality (n) of NPN transistors 41, and two constant current sources 43A and 43B. The PNP transistor 42 is connected at a base to emitters of the NPN transistors 41, at a collector to a second power supply voltage $-V_{EE}$. The NPN transistors 41 are connected at bases to input terminals $X_1, X_2, X_3, \ldots, X_n$, respectively, and at collectors to a first power supply voltage $+V_{CC}$. The constant current sources 43A and 43B are connected between the first power supply voltage $+V_{CC}$ and the output terminal Z, and between the base of the PNP transistor 42 and a second power supply voltage $-V_{EE}$, respectively.

In this MAX arithmetic circuit, the output signal $$Z\left(= \bigcup_{i=1}^{n} X_i\right)$$

is determined by a maximum value among the input signals $X_1, X_2, \ldots, X_n$ applied to the bases of the transistors 41.

The truncation gate circuit includes a plurality (n) of pairs of PNP transistors 42, a plurality (n) of NPN transistors 41, a plurality (n) of first constant current sources 43A, and a plurality (n) of second constant current sources 43B. In each pair of the PNP transistors 42, two PNP transistors are connected at collectors to ground in common, and at emitters to a base of the corresponding NPN transistor 41. A base of one PNP transistor in each pair is connected to either terminal of input terminals $b_1, b_2, b_3, \ldots, b_n$, and a base of the other PNP transistor is connected in common to a predetermined voltage (a). The NPN transistors 41 are connected at collectors to a first power supply voltage $+V_{CC}$ in common, and at emitters to output terminals $b_1', b_2', b_3', \ldots, b_n'$, respectively. Each of the first constant current sources 43A is connected between the first power supply voltage $+V_{CC}$ and the base of the corresponding NPN transistor 41, and each of the second constant current sources 43B is connected between the second power supply voltage $-V_{EE}$ and the corresponding terminal of the output terminals $b_1', b_2', b_3', \ldots, b_n'$, respectively.

In this truncation gate circuit, the fuzzy word B consisting of bits $b_1, b_2, \ldots, b_n$ is applied to the bases of the transistors 42, and the head-cut process is carried out to provide the output signal B consisting of bits $b_1', b_2', \ldots, b_n'$.

Figure 4:
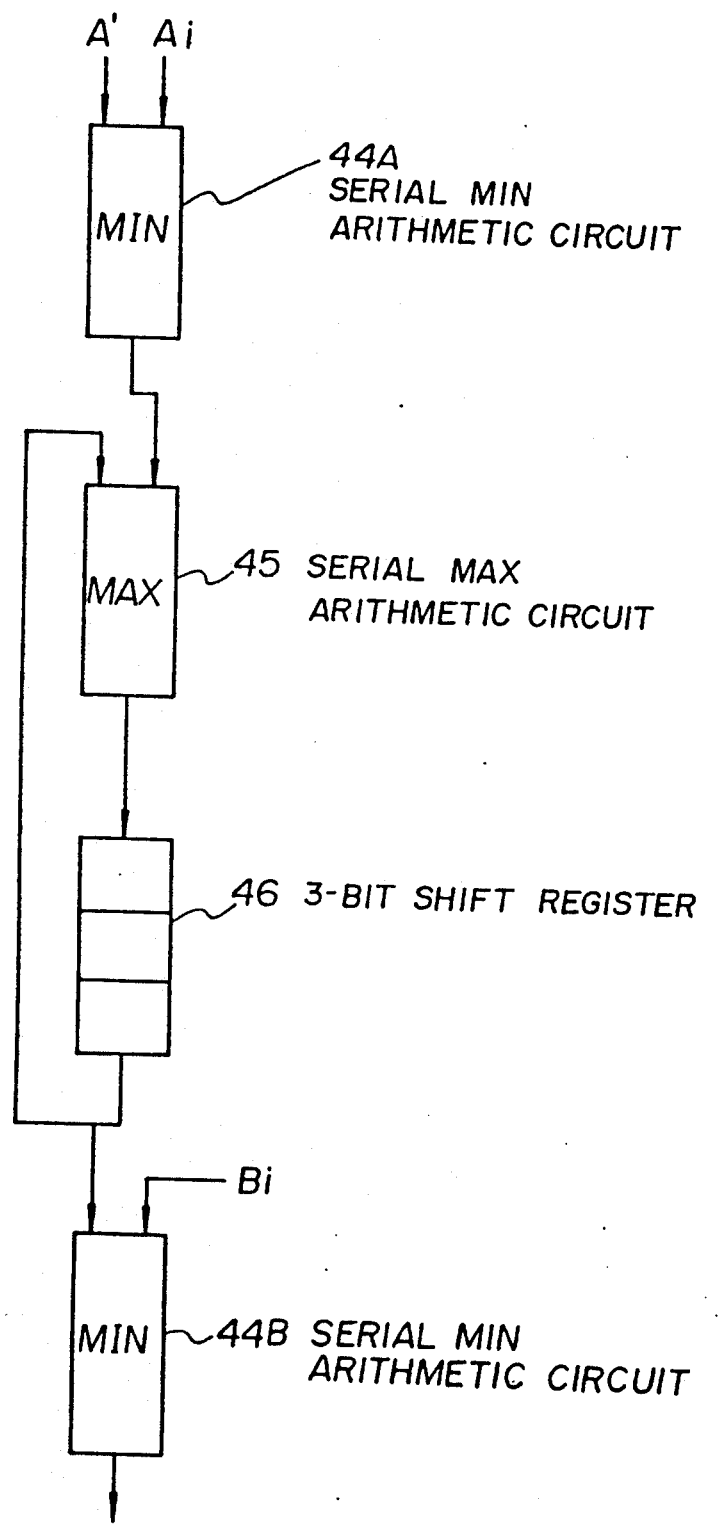
FIG. 4 is a block diagram illustrating a digital fuzzy arithmetic circuit in a conventional digital hardware system.

FIG. 4 shows the basic block of the conventional digital fuzzy system. The basic block includes two serial MIN arithmetic circuits 44A and 44B each having two input terminals, a serial MAX arithmetic circuit 45 having two input terminals, and a 3-bit shift register 46. The first serial MIN arithmetic circuit 44A is supplied with fuzzy word Ai which is the data of the previous stage and the fuzzy word A' which represents the fact information are supplied as every 4-bit word (element) to get the smaller one to be supplied to the serial MAX arithmetic circuit 45. The serial MAX arithmetic circuit is supplied with the result of the MIN arithmetic process in the first serial MIN arithmetic circuit 44A and an output of the 3-bit shift register 46 to get the larger one to be supplied to the 3-bit shift register 46. The 3-bit shift register 46 shifts the supplied element in turn to be supplied to both the serial MAX arithmetic circuit 45 and the second serial MIN arithmetic circuit 44B. The second MIN arithmetic circuit 44B is supplied with the element from the 3-bit shift register 46 and a corresponding element of a fuzzy word Bi to get the smaller one to be supplied as an output.

Figure 6:
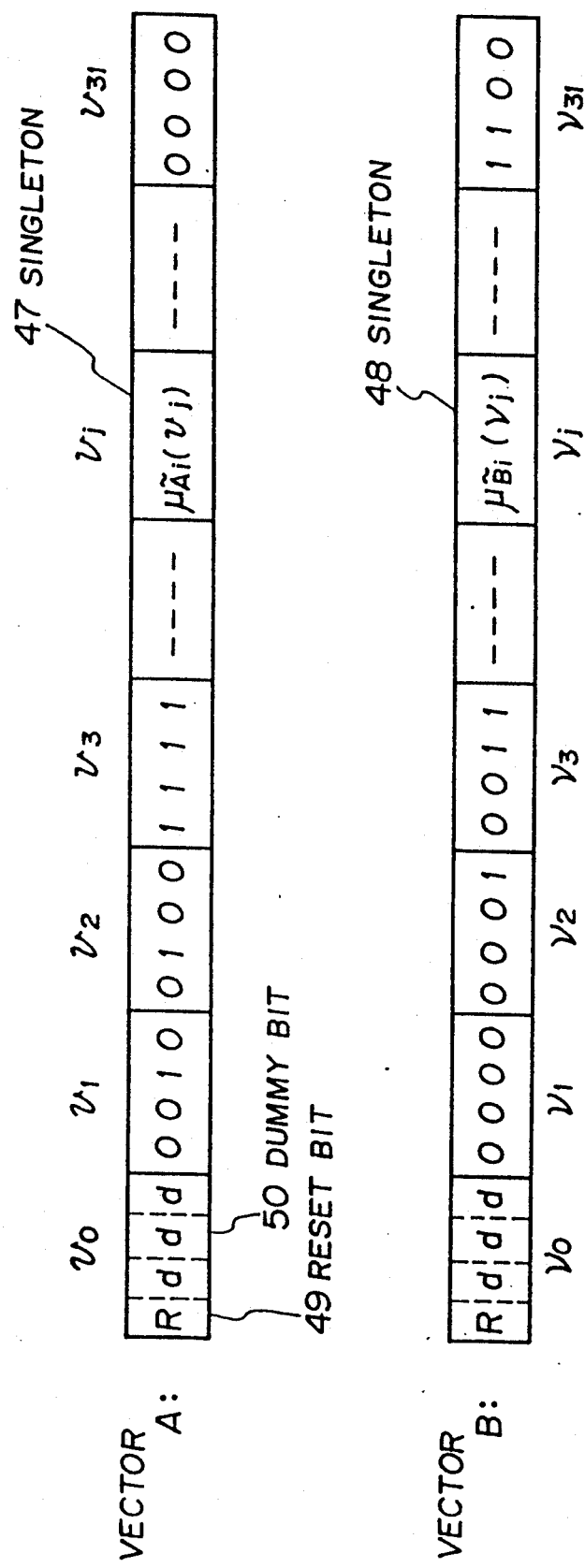
FIG. 6 is an explanatory view illustrating fuzzy words used in the conventional digital hardware system.

FIGS. 5A to 5C show sampling of the fuzzy word in accordance with membership function. The fuzzy word has a broad figure as a fuzzy set, as shown in FIG. 5A. The fuzzy set is sampled to be a number (m) of singletons, as shown in FIG. 5B. Accordingly, the fuzzy set is represented by a vector A, as shown in 5C, for example. Each singleton of the vector A is represented by 4-bit word $v_0, v_1, v_2, v_3, \ldots, v_i, \ldots$, or $v_{31}$, and that of a vector B is represented by 4-bit word $v_0, v_1, v_2, v_3, \ldots, v_i, \ldots, v_{31}$, as shown in FIG. 6. Each of the first singletons $v_0$ and $v_0$ consists of a reset bit 49 and three dummy bits 50.

Next, a fuzzy hardware system in a preferred embodiment according to the invention will be explained.

FIGS. 7A, 7B, 8A and 8B show basic principle of operation of MIN and MAX arithmetic processes of the fuzzy hardware system in the preferred embodiment. The MIN and MAX arithmetic processes are carried out by OR and AND gates 4 and 5 composing the MIN and AND arithmetic circuits, respectively. In this case, pulses $A_i$ and $B_i$ whose widths correspond in sizes of singletons of number (i) composing membership functions A and B respectively are supplied to the OR and AND gates 4 and 5.

Figure 7A:
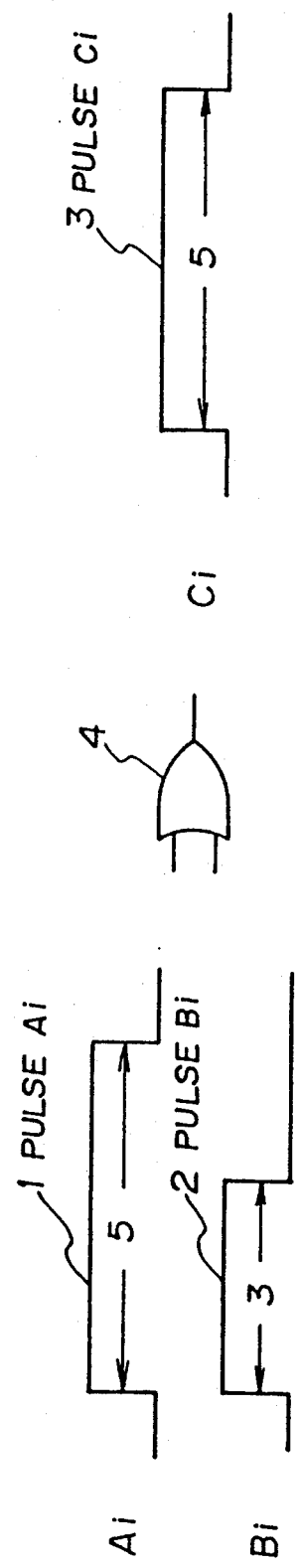
FIGS. 7A and 7B are explanatory views explaining operation of MIN and MAX arithmetic processes in case of a signal having pulse width corresponding to a value of data.
Figure 7B:
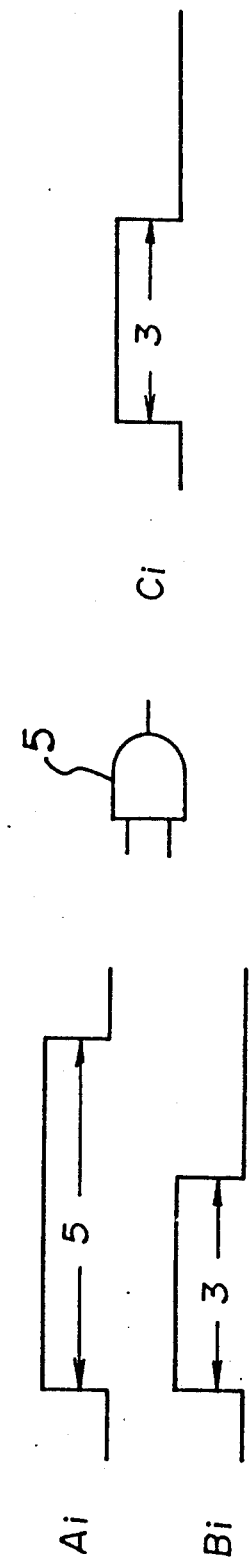

If the pulses $A_i$ and $B_i$ have widths of "5" and "3" corresponding to sizes of singletons, respectively, the MAX and MIN arithmetic processes of the pulses $A_i$ and $B_i$ are carried out by logic processes of OR and AND, and output pulses $C_i$ have widths of "5" 0 and "3", respectively, as shown in FIG. 7A and 7B. If the pulses $A_i$ and $B_i$ have pulse columns having pulse number of "5" and "3" corresponding to sizes of singletons, respectively, the MAX and MIN arithmetic processes of the pulses $A_i$ and $B_i$ are also carried out by logic processes of OR and AND, and output pulses $C_i$ have pulse columns having pulse number of "5" and "3", respectively, as shown in FIGS. 8A and 8B.

Figure 9:
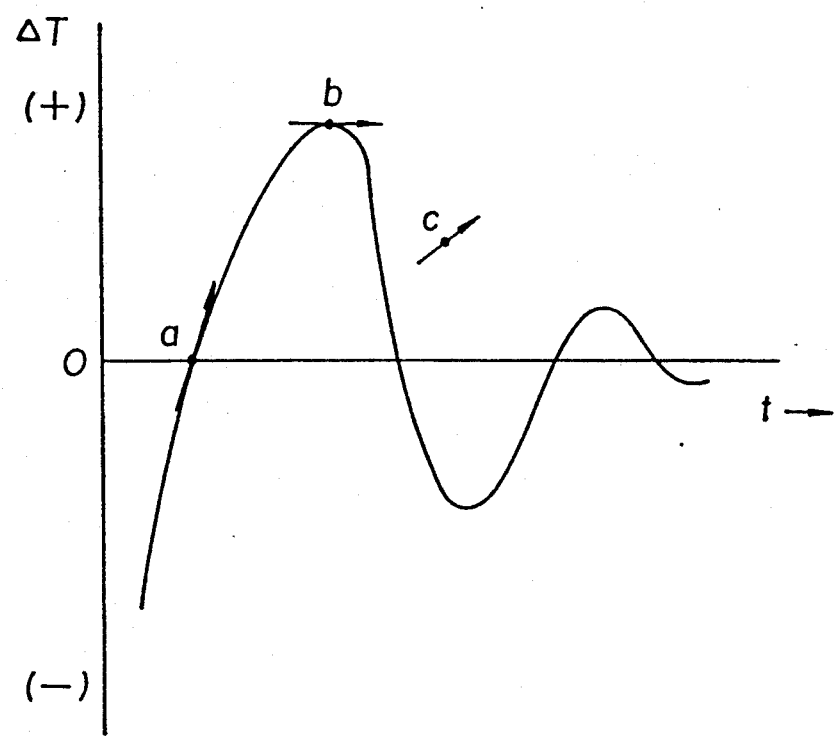
FIG. 9 is a graph showing temperature changes of a room in which a temperature is to be controlled by a fuzzy hardware system.

Next, the fuzzy control in case of temperature control of an air conditioner will be explained. In FIG. 9, temperature difference $\Delta T$ between a room temperature and a predetermined temperature is shown by a curved line related with time t. There is a law of experience in that it is the state of intensive cooling when the temperature difference $\Delta T$ is null and the temperature to time change $(d/dt) \Delta T$ is relatively large (corresponding to the point "a" in FIG. 9), and it is the state of medium cooling when the temperature difference $\Delta T$ is relatively large and the temperature to time change $(d/dt) \Delta T$ is null (corresponding to the point "b" in FIG. 9). If the fact information in which the temperature difference $\Delta T$ and the temperature to time change $(d/dt) \Delta T$ are both slightly large (corresponding to the point "c" in FIG. 9) is supplied as the input, the deductions are carried out in such manners shown in FIGS. 11A to 11I.

Figure 10:
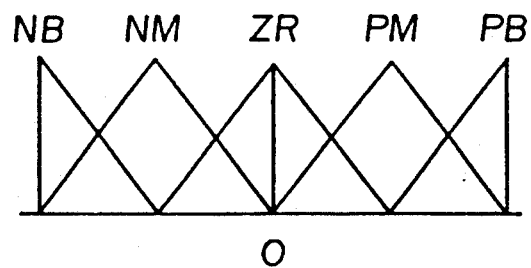
FIG. 10 is an explanatory view illustrating membership functions used in operation of the fuzzy hardware system.
Figures 11A, 11B, 11C, 11D, 11E, 11F, 11G, 11H, 11I:
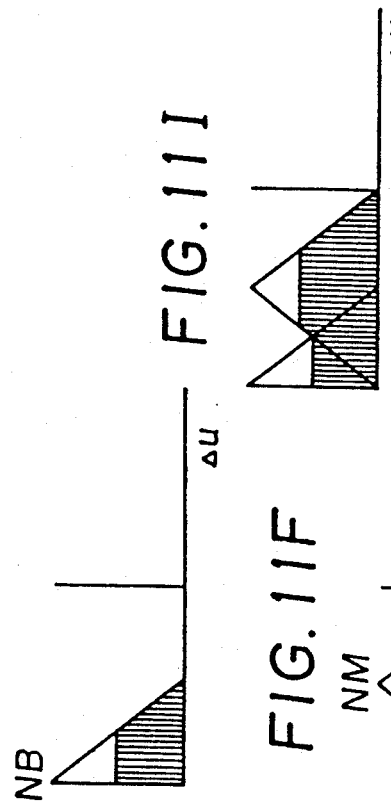
FIGS. 11A, 11B, 11C, 11D, 11E, 11F, 11G, 11H and 11I are explanatory views illustrating deduction process in operation of the fuzzy hardware system.

In these deductions, membership functions NB, NM, ZR, PM and PB which are triangle fuzzy numbers are used, as shown in FIG. 10. Deduction rules are obtained by a law of experience, as following:

if $\Delta T$ is ZR and $(d/dt)\Delta T$ is PM (1)
then $\Delta u$ is NB if $\Delta T$ is PM and $(d/dt)\Delta T$ is ZR (2)
then $\Delta u$ is NM where $\Delta u$ is the change of the predetermined temperature, and "and" represents the fuzzy logic multiplication. FIGS. 11A to 11C explain the deduction rule (1), while FIGS. 11D to 11F explain the deduction rule (2).

Next, the degrees of contribution of the deduction rules (1) and (2) to the fact information will be explained. Now, it is supposed that the membership functions of the fact information are represented by 9 and 10 in FIGS. 11G and 11H. In the MAX·MIN·center of gravity method, as for the deduction rule (1), the degree of matching of the fact information 9 with the membership function ZR is represented by the region of vertical lines, as shown in FIG. 11A, and the maximum value is obtained as an adaptation $m_a$. On the other hand, the degree of matching of the fact information 10 with the membership function PM is represented by the region of vertical lines, as shown in FIG. 11B, and the maximum value is obtained as an adaptation $m_b$. In the MAX·MIN·center of gravity method, MIN arithmetic process is carried out as the fuzzy logic multiplication, so that the smaller one ($m_b$ in this case) of $m_a$ and $m_b$ is selected as the representation value. Then, the degree of the result of the deduction rule (1) is adapted, in other words, the membership function NB is head-cut ($\alpha$-cut) by $m_b$. Thus, the degree of contribution of the deduction rule (1) is represented by the region of vertical lines in FIG. 11C. In the same manner, the degree of contribution of the deduction rule (2) is represented relative to the membership function NM by the region of vertical lines in FIG. 11F, as the results of the matching degrees relative to the membership functions PM and ZR as shown in FIGS. 11D and 11E. Then, MAX arithmetic process between the regions of vertical lines respectively shown in FIGS. 11C and 11F is carried out to deduce the result, as shown in FIG. 11I. The result of the deduction is obtained by calculating the center of gravity of the region thereof.

Figure 12A:
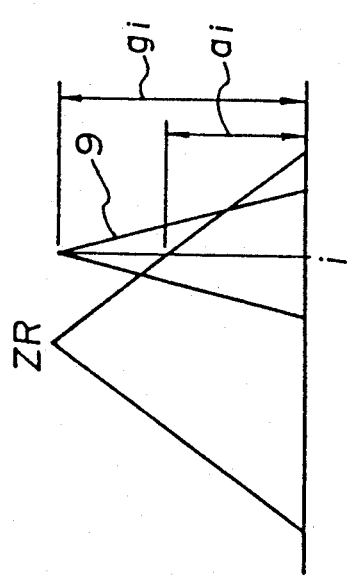
FIGS. 12A and 12B are explanatory views illustrating the deduction process in more detail than that in FIGS. 11A to 11I.
Figure 12B:
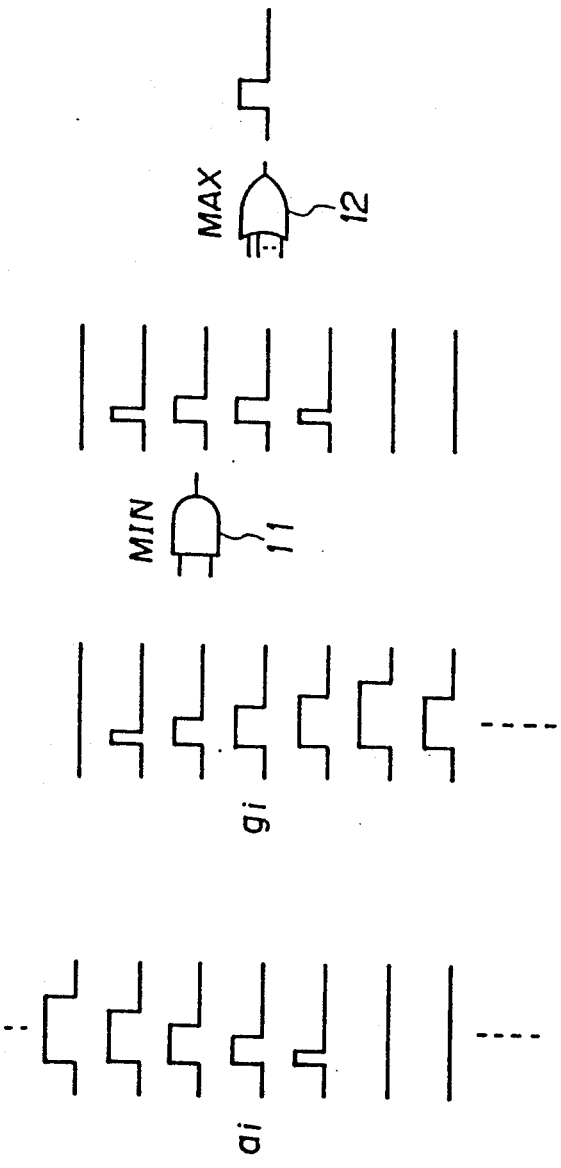
Figure 13:
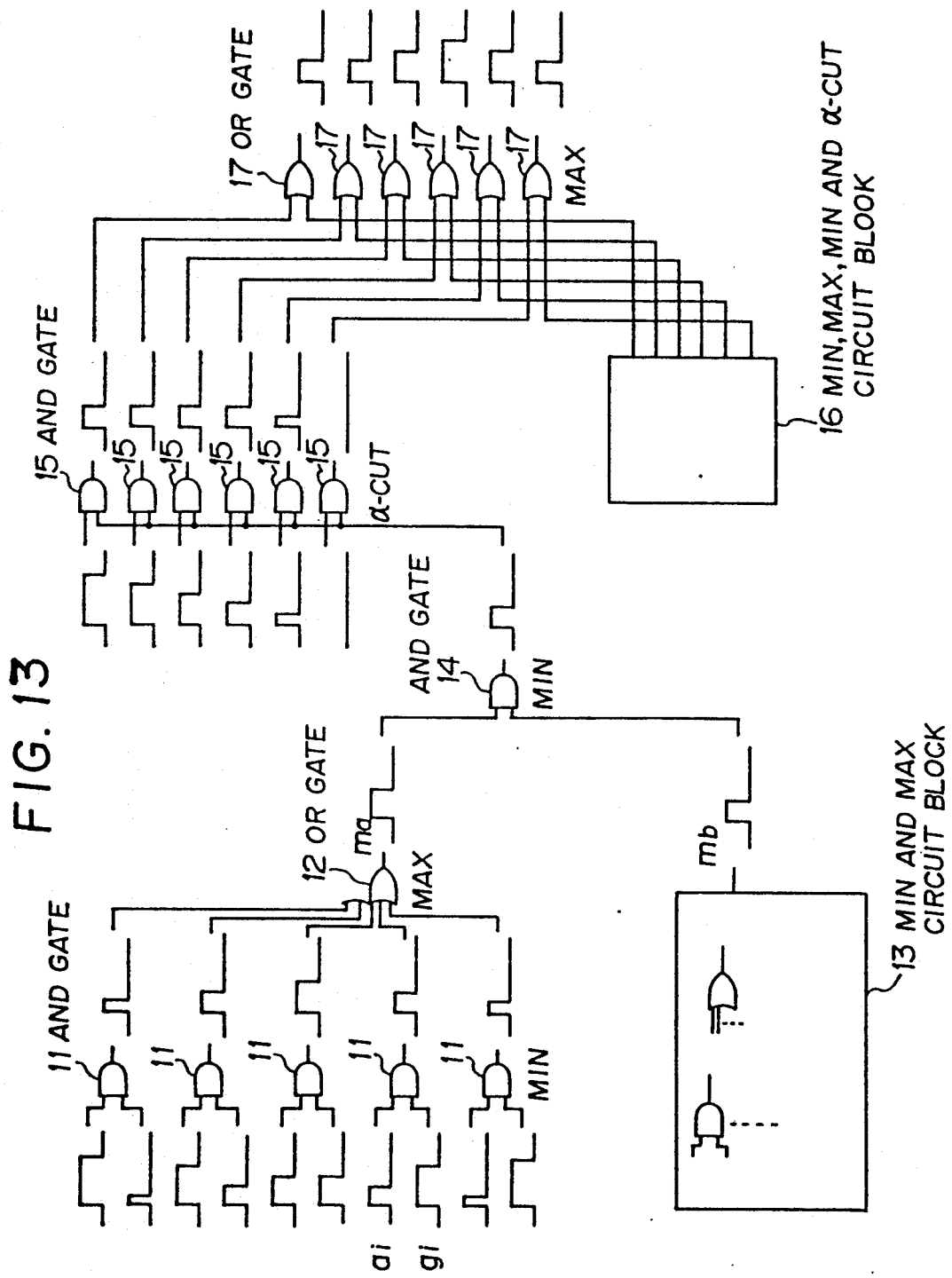
FIG. 13 is an explanatory view illustrating signal processes in the deduction process in the fuzzy hardware system.

Next, the signal process by parallel process using the fuzzy hardware system in the preferred embodiment will be explained. In FIG. 12A, signals $a_i$ and $g_i$ correspond to $a_i$ and $g_i$ in FIGS. 11A and 11G, respectively. The region of vertical lines in FIG. 11A can be obtained by carrying out MIN arithmetic process as an output of an AND gate 11, and the maximum one $m_a$ can be obtained by carrying out MAX arithmetic process as an output of an OR gate 12, as shown in FIG. 12B. Such MIN and MAX arithmetic processes are carried out in a MIN and MAX circuit block 13 including AND gates 11 and an OR gate 12 to obtain $m_a$ and $m_b$, as shown in FIG. 13. After carrying out MIN arithmetic process of $m_a$ and $m_b$ by an AND gate 14, $\alpha$-cut process of the membership function NB, for example, is carried out by a plurality of AND gates 15. Such processes are carried out for the deduction rules (1) and (2) by a MIN, MAX, MIN and $\alpha$-cut circuit block 16 including the AND gates 11, the OR gates 12, the AND gate 14, and the AND gates 15. Then, MAX arithmetic process is carried out by a plurality of OR gates 17. Then, the center of gravity of outputs of these OR gates 17 is calculated to provide a result of the deduction.

Figure 14:
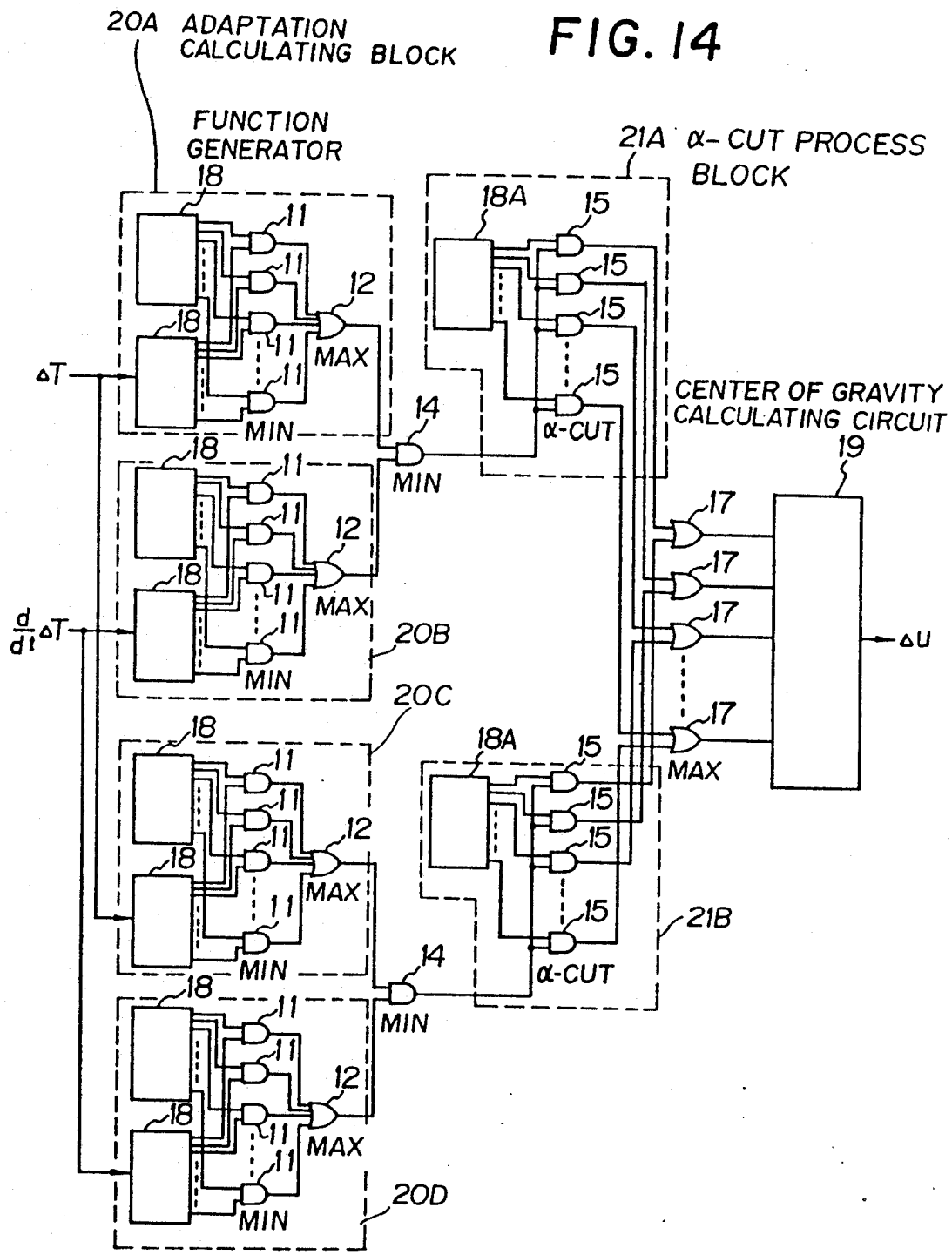
FIG. 14 is a block diagram illustrating a fuzzy hardware system in a preferred embodiment according to the invention.

FIG. 14 shows a digital fuzzy hardware system in a preferred embodiment according to the invention. The digital fuzzy hardware system includes adaptation calculating blocks 20a to 20d, two AND gates 14, $\alpha$-cut process blocks 21a and 21b, a plurality of OR gates 17, and a center of gravity calculating circuit 19. Each of the adaptation calculating blocks 20a to 20d includes two function generators 18, a plurality of AND gates 11, and an OR gate 12. One of the two function generators 18 generates pulses each having a width corresponding to a sampled value of a predetermined membership function, and the other generates pulses each having a width corresponding to a sampled value of the fact information. Each of the AND gates 11 is supplied with pulses from the two function generators 18. The OR gate 12 is supplied with outputs of the plurality of the AND gates 11. The two AND gates 14 are supplied at two input terminals with outputs of the OR gates 12 of the adaptation calculating blocks 20a and 20b and outputs of the OR gates 12 of the adaptation calculating blocks 20c and 20d. Each of the α-cut process blocks 21a and 21b includes a function generator 18A and a plurality of AND gates 15. The function generator 18A generates pulses each having a width corresponding to a sampled value of a predetermined membership function. The AND gates 15 are supplied with corresponding pulses from the function generator 18A and an output of the corresponding AND gate 14 in common. Each of the OR gates 17 is supplied at two input terminals with outputs of the corresponding pair of the two AND gates 15 of the α-cut process blocks 21a and 21b. Outputs of the OR gates 17 are supplied to the center of gravity calculating circuit 19 where the center of gravity of the outputs thereof is calculated as Δu.

In this digital fuzzy hardware system, each of the AND gates 11 of the adaptation calculating blocks 20a and 20c supplies a minimum value between a membership function supplied from the function generator 18 and a fact information supplied from the temperature difference ΔT-modulated function generator 18, and each of the AND gates 11 of the adaptation calculating blocks 20b and 20d supplies a minimum value between a membership function supplied from the function generator 18 and a fact information supplied from the temperature to time charge (d/dt) ΔT-modulated function generator 18. Then, the AND gates 12 supply maximum values for the temperature difference ΔT in the adaptation calculation blocks 20a and 20c, and for the temperature to time change (d/dt) ΔT in the adaptation calculation blocks 20b and 20d. One of the maximum values of the blocks 20a and 20b is selected as a first minimum value by the AND gate 14, and one of those of the blocks 20c and 20d is selected as a second minimum value by the other AND gate 14. Then, the first and second minimum values are supplied to the AND gates 15 of the α-cut process blocks 21a and 21b for the logic AND calculation with membership functions supplied from the function generators 18A and 18B, respectively. Thereafter, the output signals of the AND gates 15 of the blocks 21a and 21b are supplied to the OR gates 17 to provide maximum values between two corresponding output signals of the blocks 21a and 21b. The output signals of the OR gates 17 are supplied to the center of gravity calculation circuit 19, in which the center of gravity is calculated to provide a signal Δu for setting a temperature of an air conditioner.

Figure 15A:
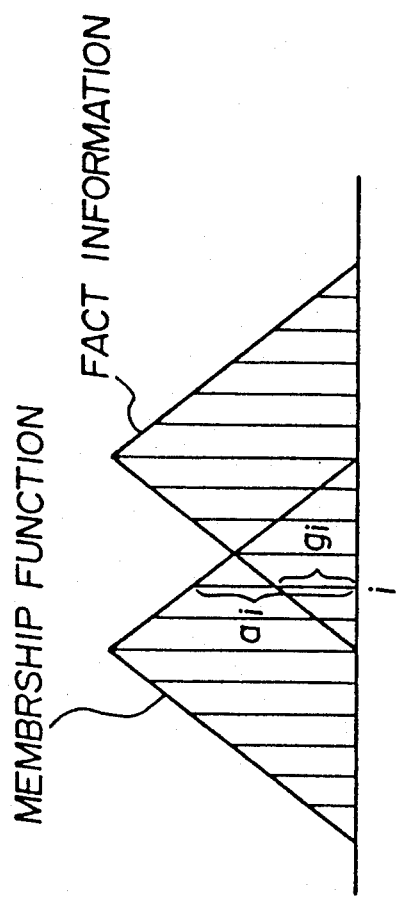
FIGS. 15A and 15B are explanatory views illustrating a serial signal process in the deduction process in the preferred embodiment according to the invention.
Figure 15B:
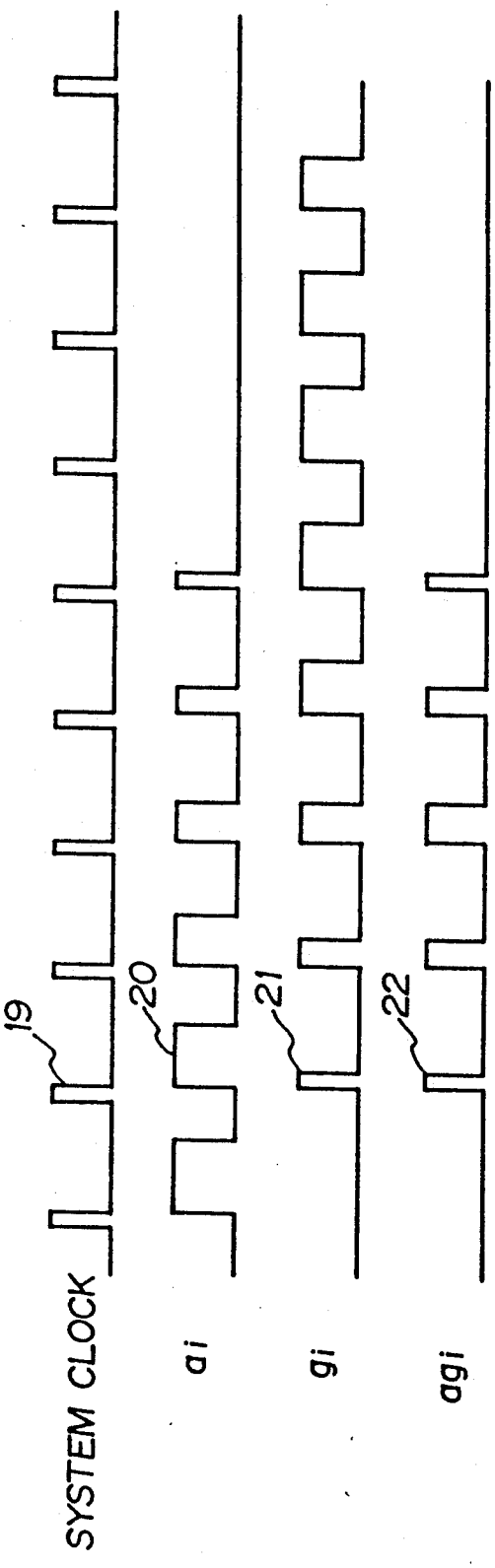

FIGS. 15A and 15B show MIN arithmetic process by serial process. The MIN arithmetic process is carried out synchronized with pulses 19 of a system clock by carrying out AND logic process of pulse 10 of $a_i$ and pulse 21 of $g_i$ to obtain pulse 22 of $ag_i$, as shown in FIG. 15B. MAX arithmetic process by serial process may be also carried out in the same manner. Therefore, parallel and serial processes may be selectively adopted or combined in the fuzzy hardware system by using a memory or registers.

Although the invention has been described with respect to specific embodiment for complete and clear disclosure, the appended claims are not to thus limited and alternative constructions that may occur to one skilled in the art which fairly fall within the basic teaching herein set forth.

What is claimed is:

1. A digital fuzzy hardware system comprising:
   a sampling circuit for sampling fuzzy membership functions so as to generate a fuzzy set consisting of a plurality of singletons each having a magnitude defined on a time axis by one of a pulse width and a pulse number of a pulse train; and
   a fuzzy logic circuit connected to said sampling circuit for receiving therefrom pulses corresponding to sampled values of a predetermined membership function and a fact information and carrying out an arithmetic process in accordance with said pulses supplied to said logic circuit;
   said fuzzy logic circuit comprising:
   a first MIN circuit for carrying out a minimum arithmetic process to obtain a minimum value from a pair of said singletons of corresponding membership functions,
   a first MAX circuit for carrying out a maximum arithmetic process to obtain a maximum value from a result of said minimum arithmetic process carried out by said first MIN circuit,
   a second MIN circuit for carrying out a minimum arithmetic process to obtain a minimum value from a result of said maximum arithmetic process carried out by said first MAX circuit,
   an α-cutting circuit for α-cutting one of the membership functions by a result of said minimum arithmetic process carried out by said second MIN circuit, and
   a second MAX circuit for carrying out a maximum arithmetic process to obtain a maximum value from a result of an α-cut operation carried out by said α-cutting circuit.

2. A digital fuzzy hardware system according to claim 1, wherein:
   said fuzzy logic circuit further comprises a circuit for calculating center of gravity of a result of said maximum arithmetic process carried out by said second MAX circuit.

3. A digital fuzzy hardware system according to claim 1, wherein:
   each of said first and second MIN circuits is an AND gate, and each of said first and second MAX circuits is an OR gate.

4. A digital fuzzy hardware system according to claim 1, wherein:
   said fuzzy logic circuit carries out said arithmetic process by one of serial, parallel and combination of serial and parallel process.

* * * * *